Feb. 7, 1967 — D. J. COX — 3,302,249
CONVEYOR-CLEANER
Filed May 15, 1962 — 3 Sheets-Sheet 1
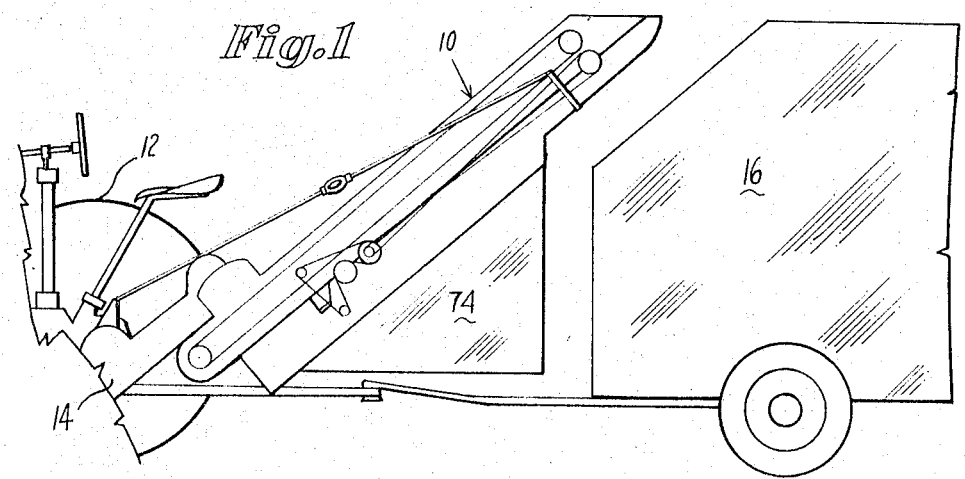
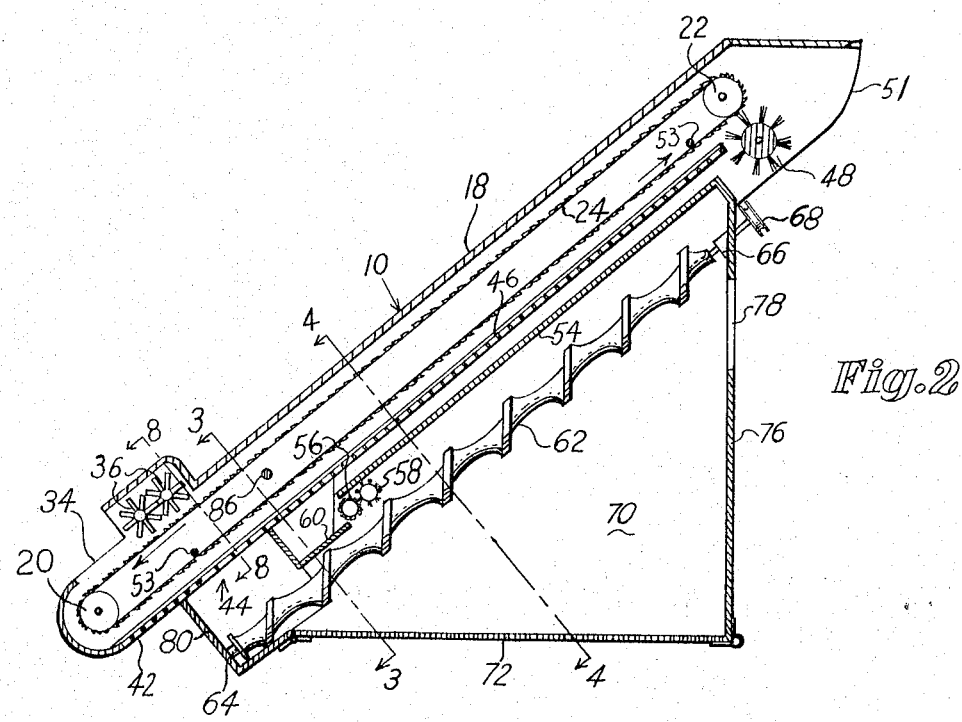
DONALD J. COX
INVENTOR.

Feb. 7, 1967     D. J. COX     3,302,249
CONVEYOR-CLEANER
Filed May 15, 1962     3 Sheets-Sheet 2
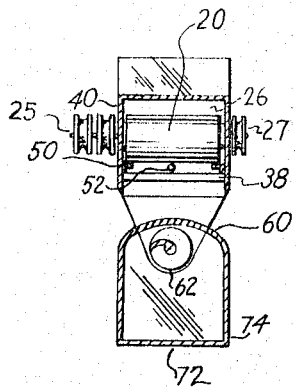
Fig. 3
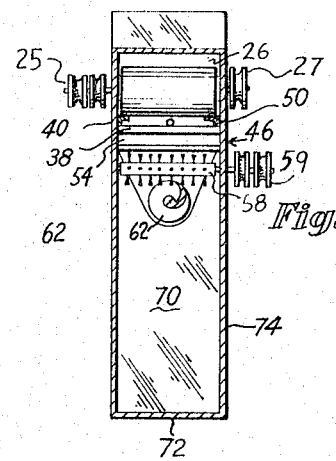
Fig. 4
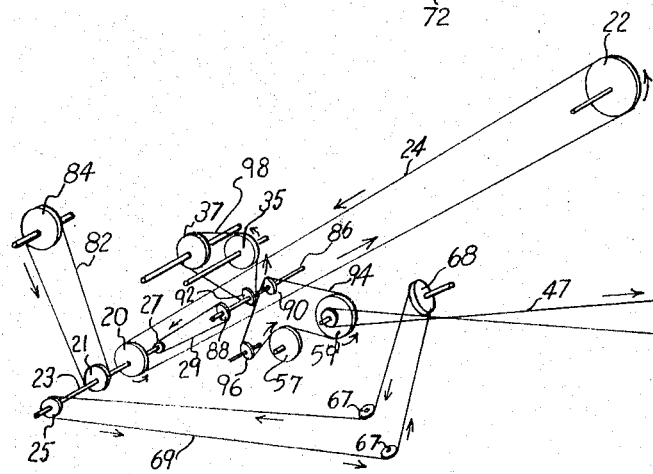
Fig. 5
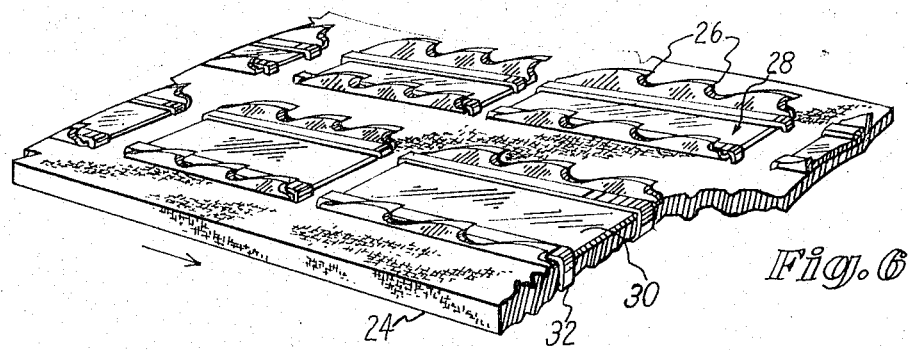
Fig. 6
Donald J. Cox
INVENTOR.
BY 

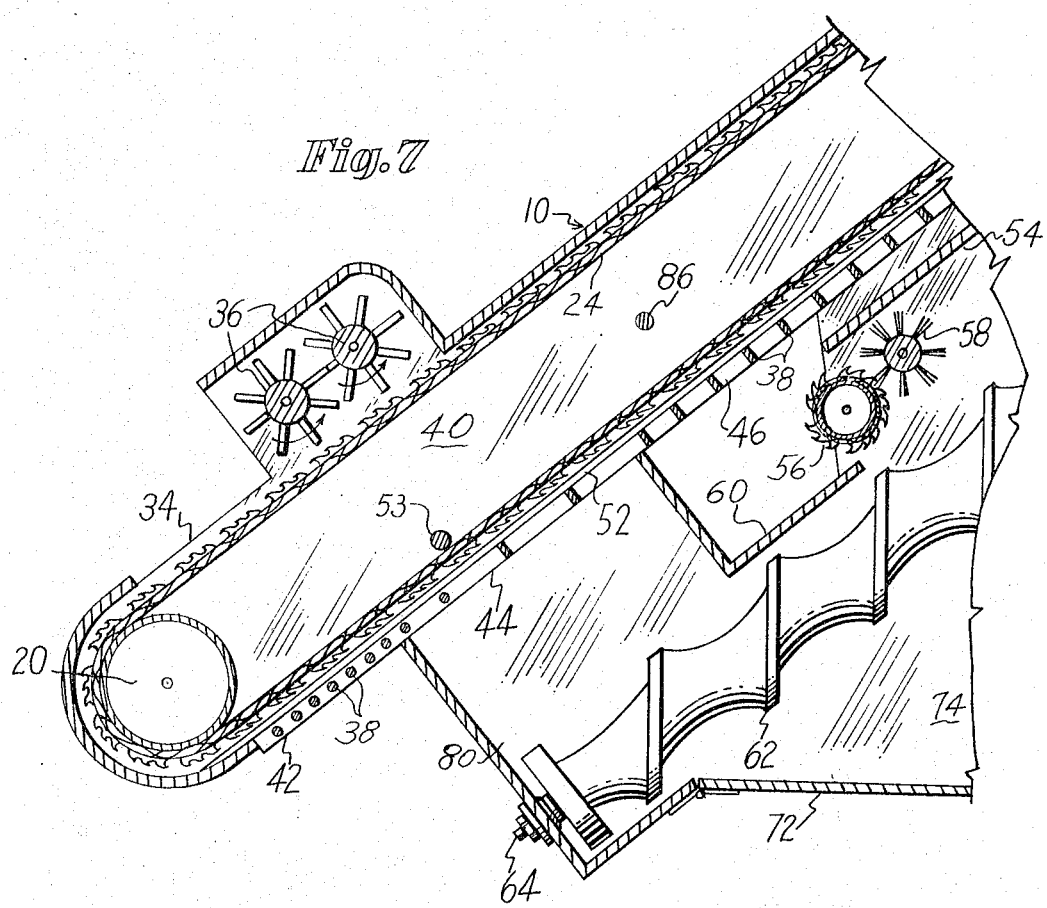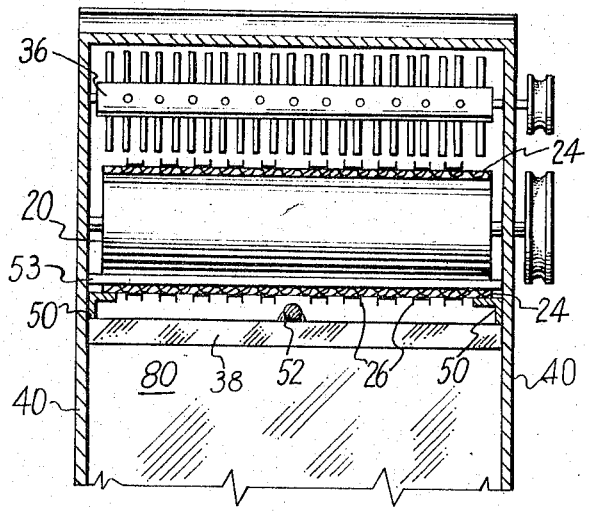

United States Patent Office 3,302,249
Patented Feb. 7, 1967

3,302,249
CONVEYOR-CLEANER
Donald J. Cox, Enochs, Tex., assignor to Cotton Enterprises, Inc., Paris, Tex., a corporation of Texas
Filed May 15, 1962, Ser. No. 194,882
5 Claims. (Cl. 19—200)

This invention relates to conveyor-cleaners and more particularly to a cleaner which will remove burs from cotton while it is being conveyed to a remote location.

This application is an improvement over my prior application, Serial Number 747,132, which issued as Patent Number 3,035,312 on May 22, 1962.

Presently much cotton is harvested by stripping it from the stalk. This stripping operation removes the cotton, burs, and certain amount of limbs and trash. It is desirable to remove this trash before the cotton is loaded onto a trailer to be carried to the gin for further processing. The advantages of removing the burs and other trash are that it may be returned to the land for soil improvement; the excess trash is prevented from being ground into the cotton fiber; and the charges for ginning the cotton are lessened inasmuch as the charge is made on the basis of the weight of raw cotton.

According to this invention the cotton is impaled upon picks. The picks are mounted upon a moving conveyor belt which lifts and moves the cotton rearward from the point of discharge from the stripping mechanism located on the tractor. While it is impaled upon the picks, burs, sticks, and trash are removed from it. When it has been moved to a position above the trailer, the cotton is doffed from the picks by conventional means.

The above paragraph describes one specific use for my new invention. The invention is of general utility. I.e., it may be used to clean locks of other fiber, either of plant origin, animal origin, or synthetic. Such a belt would have general utility, e.g., picking up cotton which has fallen to the ground.

An object of this invention is to provide a machine for cleaning locks of fiber while simultaneously conveying them to a different location.

A specific object is to provide a means for cleaning cotton while it is being conveyed from a stripper to a trailer.

Another object is to provide a machine which separates the open cotton from green bolls and places the green bolls in a separate container.

A further object is to provide a belt with picks thereon to impale locks of fiber for the purpose of picking them up or conveying them to a different location.

Still further objects are to achieve the above with a device that is sturdy, compact, durable, simple, and reliable, yet inexpensive and easy to manufacture.

The specific nature of the invention as well as other objects, uses, and advantages thereof will clearly appear from the following description and from the accompanying drawing, the different views of which are not necessarily to the same scale, in which:

FIG. 1 is an elevational view of a conveyor-cleaner according to this invention, with a partial showing of associated equipment.

FIG. 2 is an axial sectional view of the conveyor-cleaner shown in FIG. 1.

FIG. 3 is a cross-sectional view taken on line 3—3 of FIG. 2.

FIG. 4 is a cross-sectional view taken on line 4—4 of FIG. 2, with shaft 86 not shown for simplicity.

FIG. 5 is a perspective, schemaic representation showing the belting of the different rotating elements.

FIG. 6 is an enlarged partial perspective view showing the belt with the picks attached thereto.

FIG. 7 is an enlarged axial sectional view showing a portion of the machine shown in FIG. 2 to better illustrate details thereof.

FIG. 8 is an enlarged sectional view taken on line 8—8 of FIG. 2.

As may be seen in the accompanying drawings, the conveyor-cleaner 10 is attached to the rear of wheeled vehicle in the form of standard farm tractor 12 which carries cotton gatherer or stripper 14, the rear portion of which conveys the cotton to the conveyor-cleaner 10 (FIG. 1). Trailer or cotton receiving means 16 is attached behind the tractor 12 to receive the cotton from the conveyor-cleaner 10. The conveyor-cleaner 10 is attached to the tractor 12 by conventional means well within the skill of the art and will not be discussed further here.

The conveyor-cleaner 10 includes frame 18 which also acts as the outside cover of the mechanism (FIG. 2). The frame 18 is an elongated frame; the axis thereof extends upward and rearward. Pulley 20 is at the extreme lower end and pulley 22 is at the extreme upper end of the frame. These pulleys are mounted for rotation on shafts which are horizontal and normal to the axis of the frame 18. Belt 24 is trained over these pulleys 20 and 22. The belt 24 is a continuous belt. It is not meant to say it is made of a single unit, but it may be joined by conventional laces in various points so that the complete unit is a continuous belt.

The belt 24 carries a plurality of picks 26 thereon (FIG. 6). These picks 26 are in the form of saw teeth. Conventionally cotton is impaled by similar picks or saw teeth mounted on drums to be processed. The picks 26 are arranged in rows along channel-shaped metal strips 28. The two rows of picks 26 of each metal strip 28 are connected by web 30 which lies flat upon one surface of the belt 24. The strip 28 is attached to the belt by means of staples 32; one attached around the web 30 and through the belt 24 at each side of the web 30. I.e., each staple 32 will run parallel to one row of picks 26 along the channel-shaped metal strip 28.

There are other ways in which picks could be attached to one surface of a belt. In any event, one surface of the belt 24 is covered with metal picks 26, all of which are pointing in the direction of movement of the belt; therefore, they are all aligned with the length of the belt.

The top of the conveyor-cleaner 10, near the lower end thereof, has an opening 34 for the cotton to enter from a conveyor of the cotton stripper mechanism 14. The belt 24 is travelling downward at this point with the picks 26 pointing downward. Each lock of cotton will be impaled on one or more picks 26. Any excess cotton will be moved backward and upward by one of the two rotating beaters 36. Each beater 36 includes a plurality of spikes mounted on a shaft. The shafts are rotated so that the spikes adjacent to the picks 26 are moving in an opposite direction from the picks. One purpose of beaters 36 is to even the cotton out, making sure that all cotton that enters through the opening 34 is impaled upon a pick 26 and there are no wads or slugs of cotton to go through without being impaled. The cotton once impaled, follows the belt 24 as it goes around pulley 20. At the bottom of pulley 20 the cotton comes in contact with a plurality of knocker elements. These knocker elements are in the form of bars 38 attached from one side 40 of the frame 18 to the other side 40. The bars 38 are in close proximity with the picks 26 as they move upward. The individual bars 38 are about one-eighth inch thick and extending from one side to the other. The bars are at right angles to the axis of the frame 18, and about one inch wide. In area 42, the bars 38 are located at the extreme lower end of frame 18. They are approximately five-eights inch on centers so that there is about one-half inch between adjacent bars 38 for trash and burs to fall through. The bars in area 42 are close enough to prevent any green bolls from falling through. An alternate arrangement is to provide the bars 38 in the area 42 in the form of cylindrical rods one-half inch diameter about one inch on centers. I have found that the green bolls and rocks have less tendency to hang against cylindrical rods than rectangular cross sectioned bars.

Immediately above the lower area 42 there is an area 44 of the bars 38 which are spaced with about one and one-half inch of clearance between the bars 38. This is sufficient space for green bolls to fall through the bars 38 of this area 44 to be disposed in a manner which will be described later.

Immediately above and behind the area 44 there is another area 46. The knocker elements 38 in the area 46 are in the form of bars having rectangular cross section with about seven-eighths inch space between them. This is sufficient space for trash and burs to fall through.

Cylindrical brush 48 is located at the upper end of the frame 18 below the pulley 22. The brush 48 rotates so that the peripheral speed of the bristles of the brush are travelling faster than the picks 26 upon the belt 24. Therefore, the cotton is doffed from the pick 26 in a conventional manner and discharged through opening 51 in the frame. The cotton as it is doffed from the picks 26 is moved by the air created by the rotation of the brush 48 into the trailer 16 to be conveyed to the cotton gin for further processing.

The belt 24 has a rather long stretch between the pulleys 20 and 22 and will tend to sag and ride against the bars 38. Runners 50 prevent excessive dragging. These runners are attached to the sides 40 immediately above the bars 38. The edges of the belt 24 ride on these and therefore the belt 24 is supported by these runners 50 rather than by the picks 26 dragging across the bars 38. In the center or halfway between the runners 50, rod 52 runs parallel to the axis of the frame 18. The center of the belt 24 flaps upon this, also preventing the picks 26 from riding on the bars 38 (FIG. 8).

Hold down bars 53 extend between the sides 40 on the back side of belt 24 and hold the picks 26 proximate the bars 38. The picks 26 run as close as possible to the bars 38 without dragging thereon. This way the cotton is brushed across the bars to separate sticks, burs, and other trash from the lint cotton, the lint being impaled upon the picks 26. The lint passes over a plurality of the bars 38 to effect a thorough cleaning. It is not necessary for a single bar 38 to remove all the foreign material from the locks of impaled lint. Gravity aids each bar 38 in removing foreign material.

A chute, including bottom 54 and downward extensions of sides 40, is provided so that all the trash which falls through the area 46 is conveyed down to a reclaimer saw cylinder 56. The trash passes over the reclaimer saw cylinder 56, but any locks of cotton will be impaled upon the saw teeth or picks of the saw cylinder 56 and carried over so that they will be doffed therefrom by reclaiming brush cylinder 58 (FIG. 7). The locks of cotton thus reclaimed will be brushed into container or boll box 70 which also contains the green bolls and will be reclaimed along with them.

A certain amount of trash will be carried with the green bolls to the boll box 70. This is not undesirable inasmuch as the dry trash prevents the green bolls from mildewing while they are in storage. Afterwards the green bolls are placed in piles in the field until they dry and open. Then they are loaded and are carried away for processing.

The trash, after passing over the reclaimer saw 56 will fall upon hood 60 which covers conveyor 62. Inasmuch as the hood 60 is convex upward (FIG. 3), the trash will roll off it onto the ground where it will be cultivated into the soil for soil improvement and conservation. This adds humus to the soil as it is desirable.

The conveyor 62 is mounted below the frame 18 and parallel to the axis thereof. It is supported by suitable bearing 64 on its lower end and bearing 66 on its upper end. Pulley 68 is connected to conveyor 62 for rotating same. The bearings 64 and 66 attach to frame 18. The conveyor 62 is also below the bottom of the chute 54 which is also below the bars 38 of area 46. The conveyor 62 runs along the top of the boll box 70 (FIG. 4). Conveyor 62 is a conventional type screw conveyor. The boll box 70 has a hinged bottom door 72 which may be opened to dump all the material therein upon the ground. The side walls 74 are approximately the same width as the frame 18. Along back wall 76 there is an opening 78 near the top. Therefore, if the boll box 70 becames full, continued addition of material into the conveyor 62 does not cause the conveyor 62 to jam but causes the additional material to fall through the opening 78.

The material is received by the conveyor 62 through passageway 80. The upper end of the passageway 80 encloses the area 44 where the bars 38 are widely separated. The conveyor 62 has no bottom. It pushes the material along with it until it reaches the top of the pile of trash and discharges it there. The material in the boll box 70 acts as the bottom of the conveyor 62. The reclaiming saw 56 and reclaiming brush 58 may be considered to be located within the boll box 70 and above the conveyor 62.

As mentioned before the belt 24 with one surface covered with picks 26 is an item of separate utility. It may be used in conveyor-cleaners as disclosed here or it could be used in installations with a conveying purpose only and no cleaning use. Also, there are other uses for such belts. E.g., picking loose cotton from the ground, such gleanings having been left by the stripper mechanism 14 mounted on the tractor 12. Also, those skilled in the art will think of other uses available for such a belt with the surface covered by picks. When I speak of belt, I not only mean rubber covered fabric belts but all similar items of utility having a high degree of flexibility or pliant nature.

Although the conveyor cleaner 10 has been described as being attached to a cotton stripper mounted upon the tractor 12, it itself would have other utility. It could be used to clean cotton in a cotton gin itself. Also, it could be used to handle raw cotton. E.g., picking it up from ricks on the ground where it might be stored and loading it into a trailer. In such case it might be powered by a small separate gasoline engine, rather than being mounted on the rear of a farm tractor. Also, when it is being used in connection with a cotton stripper, it is not necessary to use it in the exact location as shown here. It could be used to receive the cotton directly from the stripping element which is located on either side of the body of the tractor.

It will also be seen that the belt with picks 26 moves in a linear path as it passes the bars 38.

The power is conveyed to the different elements as shown in FIG. 5. The power is conveyed through belt 82 trained over pulley 84 which is connected to the tractor 12 and powered therefrom. Belt 82 is also trained over pulley 21 which is connected to a common shaft 23 with the pulley 20. Also, connected to this common shaft 23 is a pulley 25 which carries belt 69. Belt 69 trains around a pair of idler pulleys 67 as the pulley 68 which is attached to the conveyor 62. On the shaft 23 is pulley 27 which by means of belt 29 rotates jack shaft 86 through pulley 88.

Pulleys 90 and 92 are also mounted on jack shaft 86. Pulley 90 has belt 94 trained over it. The belt 94 is also trained over pulley 59 which is located on the same shaft as the reclaimer brush 58. The back of the belt 94 runs against pulley 57 which is located on the same shaft as saw cylinder 56. An idler pulley 96 is used to take up the slack in belt 94. Attached to the pulley 59 is a small pulley which drives across belt 47 which drives pulley 49 which is connected onto a common shaft with the brush 48.

Belt 98 is trained around pulley 92 and pulleys 35 and 37 which are mounted each individually on a shaft with each of the beaters 36.

The rotation of all the pulleys, shafts, and elements may be clearly seen from the directional arrows on FIG. 5.

It will be apparent that the embodiment shown is only exemplary and that various modifications can be made in construction, materials, and arrangement within the scope of the invention as defined in the appended claims.

I claim as my invention:

1. A conveyor-cleaner adapted to be attached to the rear of a tractor which carries mechanism for stripping cotton from the stalk comprising:
   (a) a frame,
   (b) said frame having a longitudinal axis which extends upward and rearward,
   (c) a lower pulley mounted on the lower end of said frame,
   (d) an upper pulley mounted on the upper end of the frame,
   (e) the pulleys mounted on parallel shafts,
   (f) a belt trained over the pulleys,
   (g) picks on one surface of the belt,
   (h) all the picks aligned in the same direction,
   (i) means for rotating the belt in the direction in which the picks are pointed,
   (j) a plurality of spaced bars,
   (k) each bar parallel to the shafts upon which the pulleys are mounted,
   (l) each bar in close proximity to the surface of the belt carrying the picks,
   (m) means on the upper end of the frame for doffing the cotton from the picks on the belt,
   (n) an area of the bars having wider spacing therebetween than other areas of the bars,
   (o) a container for collecting any materials which fall through the bars of the area, having wider spacing therebetween,
   (p) said container attached to the frame, and
   (q) a conveyor extending along the top of the container,
   (r) said conveyor being means for distributing material within said container.

2. The invention as defined in claim 1 with the addition of
   (s) a passageway beneath the bars of an area, having narrower spacing,
   (t) a saw cylinder at one end of said passageway, so arranged and constructed that the saw cylinder is adapted to impale any locks of cotton which may be within any trash in the passageway, and
   (u) means for doffing cotton from the saw cylinder into said container.

3. The invention as defined in claim 1 with the addition of
   (s) an opening in the container,
   (t) said opening being at the terminal end of the conveyor within the container, so that if the container becomes full, then additional material is discharged from the container through the opening.

4. In a cotton gathering combination including
   (a) a wheeled vehicle,
   (b) means for gathering cotton carried on the vehicle, and
   (c) cotton receiving means moving with the vehicle for receiving the cotton,
an improved conveyor-cleaner for cleaning the cotton while conveying it from the means for gathering to the receiving means, comprising in combination:
   (d) a frame attached to the vehicle,
   (e) said frame having a longitudinal axis which extends upward,
   (f) a lower pulley mounted on the lower end of said frame,
   (g) an upper pulley mounted on the upper end of the frame,
   (h) the pulleys mounted on parallel shafts,
   (i) a belt trained over the pulleys,
   (j) picks on one surface of the belt,
   (k) all the picks aligned in the same direction,
   (l) means for rotating the belt in the direction which the picks are pointed,
   (m) a plurality of spaced bars,
   (n) each bar parallel to the shafts upon which the pulleys are mounted,
   (o) each bar in close proximity to the surface of the belt carrying the picks,
   (p) means on the upper end of the frame for doffing the cotton from the picks on the belt, into the receiving means,
   (q) a chute mounted upon the frame extending beneath a portion of said bars,
   (r) a saw cylinder mounted on the frame at the bottom of said chute,
   (s) said saw cylinder having picks thereon to impale any cotton which may be within any material falling down the chute, and
   (t) doffing means mounted on the frame for doffing the cotton on the saw cylinder therefrom.

5. A conveyor-cleaner adapted to be attached to the rear of a tractor having mechanism for stripping cotton from the stalk, comprising:
   (a) a frame,
   (b) a container attached to the frame,
   (c) means attached to the frame for conveying lint cotton upward and rearward so that it may be discharged from the conveyor-cleaner,
   (d) means attached to the frame for separating green bolls from lint cotton as it is carried upward and rearward by said conveying means and dropping said separated bolls into said container,
   (e) a conveyor at the top of the container,
   (f) said conveyor being means for moving the green bolls in the container upward and rearward within the container as an accumulation of green bolls increases, and
   (g) an opening in the rear of the container so that if the container becomes full additional material falls through the opening.

References Cited by the Examiner

UNITED STATES PATENTS

| | | | |
|---|---|---|---|
| 810,898 | 1/1906 | Archer | 19—95 X |
| 1,276,370 | 8/1918 | Irwin et al. | 19—38 |
| 1,449,284 | 3/1923 | Hart | 19—97 |
| 1,476,010 | 12/1923 | Taft et al. | 19—95 X |
| 1,806,032 | 5/1931 | Wallace | 19—37 |
| 1,842,737 | 1/1932 | Tharp | 19—38 X |
| 2,016,008 | 10/1935 | Henry | 19—200 X |
| 2,526,535 | 10/1950 | Brown | 19—38 |
| 2,902,722 | 9/1959 | Wallace | 19—93 X |
| 3,015,928 | 1/1962 | Kappelmann | 56—33 |

FOREIGN PATENTS 6,007    1894    Great Britain.

MERVIN STEIN, *Primary Examiner.*

DONALD W. PARKER, D. NEWTON, *Examiners.*